United States Patent
Laube et al.

(10) Patent No.: US 11,057,704 B2
(45) Date of Patent: *Jul. 6, 2021

(54) INTEGRATED LOUDSPEAKER AND CONTROL DEVICE

(71) Applicant: Biamp Systems, LLC, Beaverton, OR (US)

(72) Inventors: Douglas Laube, Plano, TX (US); Charles D. Gollnick, Sherwood, OR (US); Dale Irving, Beaverton, OR (US)

(73) Assignee: Biamp Systems, LLC, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,041

(22) Filed: Feb. 4, 2020

(65) Prior Publication Data

US 2020/0249905 A1    Aug. 6, 2020

Related U.S. Application Data

(60) Provisional application No. 62/800,973, filed on Feb. 4, 2019.

(51) Int. Cl.
| | | |
|---|---|---|
| *H04R 3/12* | (2006.01) | |
| *H04R 1/40* | (2006.01) | |
| *H04R 3/00* | (2006.01) | |
| *H04R 29/00* | (2006.01) | |
| *G06F 3/16* | (2006.01) | |

(52) U.S. Cl.
CPC ............ *H04R 3/12* (2013.01); *G06F 3/165* (2013.01); *H04R 1/403* (2013.01); *H04R 1/406* (2013.01); *H04R 3/005* (2013.01); *H04R 29/002* (2013.01); *H04R 2430/01* (2013.01)

(58) Field of Classification Search
CPC .......... H04R 3/12; H04R 1/403; H04R 1/406; H04R 3/005; H04R 29/002; H04R 2430/01; G06F 3/165
See application file for complete search history.

(56) References Cited

U.S. PATENT DOCUMENTS

| | | | |
|---|---|---|---|
| 2005/0105743 A1 | 5/2005 | Faltesek et al. | |
| 2014/0270200 A1 | 9/2014 | Usher et al. | |
| 2015/0296289 A1* | 10/2015 | Lakkundi | H04R 3/005 381/92 |
| 2016/0064002 A1* | 3/2016 | Kim | G10L 15/22 704/246 |
| 2016/0353218 A1 | 12/2016 | Starobin et al. | |
| 2019/0214003 A1 | 7/2019 | Kobayashi et al. | |
| 2020/0105295 A1 | 4/2020 | Sereshki et al. | |

* cited by examiner

*Primary Examiner* — Fan S Tsang
*Assistant Examiner* — David Siegel

(57) ABSTRACT

An example method of operation may include receiving audio data, via one or more microphones of a network device, from an audio source, determining a location of the audio data based on a direction and amplitude of the received audio data, modifying the audio data for output via a loudspeaker of the network device, and outputting, via the loudspeaker, the modified audio data.

17 Claims, 8 Drawing Sheets

INTEGRATED LOUDSPEAKER AND CONTROL DEVICE

FIELD OF THE INVENTION

This application relates to an integrated device and more specifically to an integrated loudspeaker and control device.

BACKGROUND OF THE INVENTION

Audio product installation requires numerous devices both on the output or presentation end of the installation and with respect to the control center that is responsible for managing the signals that are sent to the audio devices.

Enterprise working environments may include a speaker or set of speakers which are hung from a suspended ceiling, some speakers may integrate a microphone into a common housing. The speakers are wired to a control unit that may include a controller device, an amplifier, wire configurations, etc. Conventionally, a systems integrator responsible for designing such systems may select a microphone from one manufacturer, a processing unit from another, an amplifier from a third, speakers from a fourth, and a control system from a fifth. Then, there may be five different accompanying software tools to setup each device separately prior to attempting to have them all work together to provide audio, switching, microphone, etc., and other services to a particular conference room or other venue.

Ideally, all such sub-systems would not only be from one manufacturer but would also be integrated into a single device which can be setup easily and in a manner that is easily adapted to an office network environment. For example, an office environment that has ample resources of power and network cables and other foundational requirements may provide an easily adaptable environment assuming all such resources could be combined into a single device. Additionally, having multiple unites installed at different locations within a particular facility may provide digital signal processing capabilities for smart audio and other types of media services.

SUMMARY OF THE INVENTION

The present application relates to a method including one or more of receiving audio data, via one or more microphones of a network device, from an audio source, determining a location of the audio data based on a direction and amplitude of the received audio data, modifying the audio data for output via a loudspeaker of the network device and outputting, via the loudspeaker, the modified audio data.

Another example embodiment may include an apparatus that includes a receiver configured to receive audio data, via one or more microphones of a network device, from an audio source, a processor configured to determine a location of the audio data based on a direction and amplitude of the received audio data, modify the audio data for output via a loudspeaker of the network device, and output, via the loudspeaker, the modified audio data.

Yet another example embodiment may include a non-transitory computer readable storage medium configured to store instructions that when executed cause a processor to perform receiving audio data, via one or more microphones of a network device, from an audio source, determining a location of the audio data based on a direction and amplitude of the received audio data, modifying the audio data for output via a loudspeaker of the network device, and outputting, via the loudspeaker, the modified audio data.

Still another example embodiment may include a method that includes one or more of receiving audio data at one or more microphones disposed in a corresponding plurality of network devices, identifying amplitude values of the audio data at each of the plurality of network devices, wherein each of the amplitude values identified at each of the plurality of network devices are different from each other of the amplitude values, determining at each of the plurality of network devices a location of the audio data based on a direction and amplitude of the received audio data, modifying the audio data for output via a plurality of loudspeakers disposed in each of the plurality of network device, and outputting, via the plurality of loudspeakers, the modified audio data, wherein each loudspeaker outputs different versions of the modified audio data.

Still another example embodiment may include an apparatus that includes a receiver configured to receive audio data at one or more microphones disposed in a corresponding plurality of network devices, a processor configured to identify amplitude values of the audio data at each of the plurality of network devices, wherein each of the amplitude values identified at each of the plurality of network devices are different from each other of the amplitude values, determine at each of the plurality of network devices a location of the audio data based on a direction and amplitude of the received audio data, modify the audio data for output via a plurality of loudspeakers disposed in each of the plurality of network device, and output, via the plurality of loudspeakers, the modified audio data, and each loudspeaker outputs different versions of the modified audio data.

Still another example embodiment may include a non-transitory computer readable storage medium configured to store instructions that when executed cause a processor to perform receiving audio data at one or more microphones disposed in a corresponding plurality of network devices, identifying amplitude values of the audio data at each of the plurality of network devices, and each of the amplitude values identified at each of the plurality of network devices are different from each other of the amplitude values, and determining at each of the plurality of network devices a location of the audio data based on a direction and amplitude of the received audio data, and modifying the audio data for output via a plurality of loudspeakers disposed in each of the plurality of network device, and outputting, via the plurality of loudspeakers, the modified audio data, and each loudspeaker outputs different versions of the modified audio data.

DETAILED DESCRIPTION

Example embodiments include a device configuration for an integrated wall or ceiling mountable network element, which can provide audio functions, microphone detection, and other sensor, functions, lighting, feedback signals, etc. The device may be part of a network of devices which are centrally controlled and managed to offer media services, and which may be controlled by feedback information used to perform beamforming computations which control the speaker volume of any one or more of the network elements in a particular environment.

Figure 1:
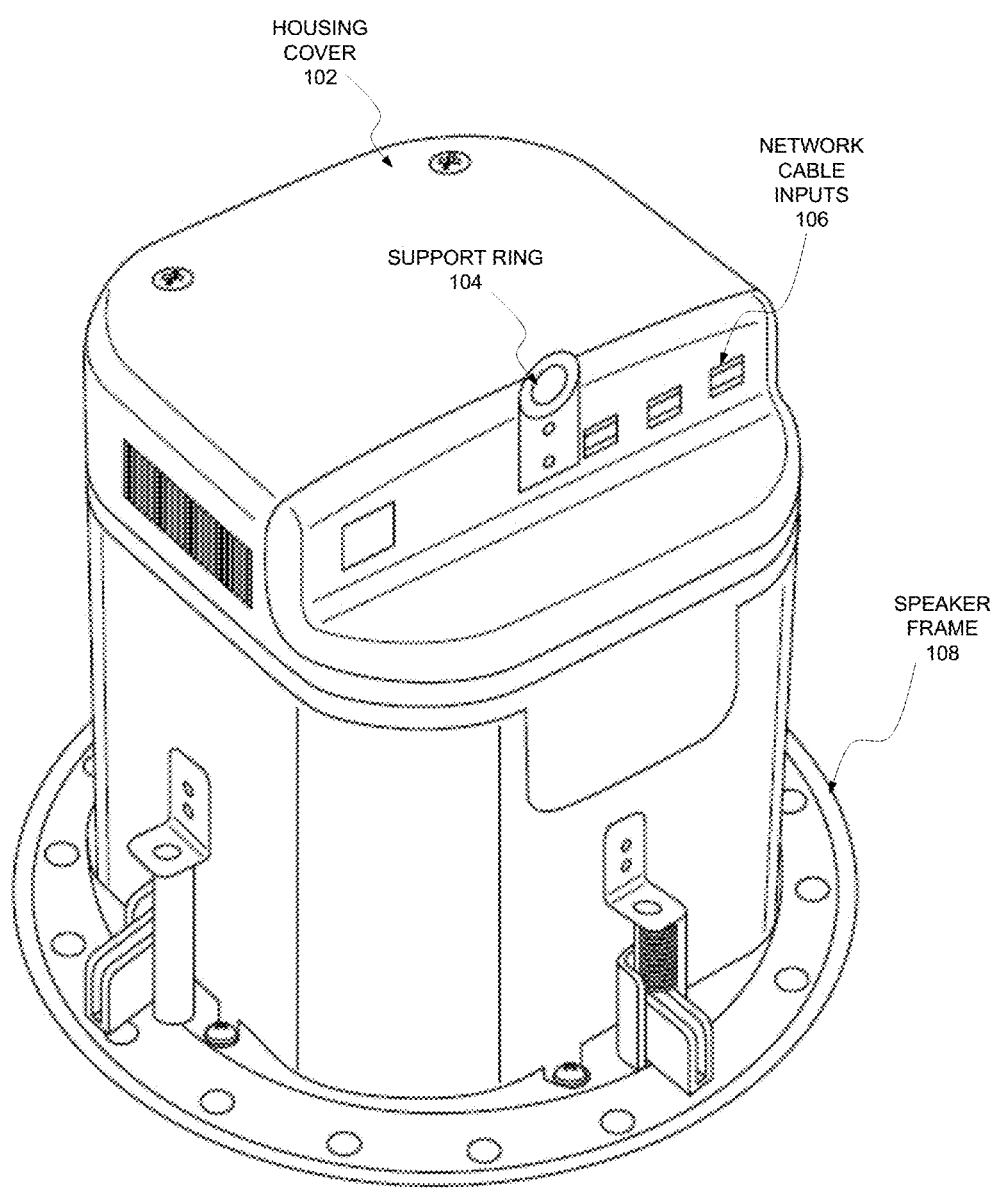
FIG. 1 illustrates an integrated media services network element according to example embodiments.

FIG. 1 illustrates an integrated media services network element according to example embodiments. Referring to FIG. 1, the example configuration includes a single integrated media services network element 100. The element may include, from a visual perspective, a tailored 'tin can' type of configuration which is compatible with a ceiling floor light or oversized flood light mounting in an industrial building designed for enterprise usage, such as a conference room, meeting hall, hallway, small or large office, series of offices, etc., where the elements are installed. The basic housing cover 102 protects the element/device and provides a support ring 104 for anchoring the element into a ceiling support in case of a compromised ceiling structure. The entire media set of sub-components (e.g., speaker, microphone, sensors (light, sound, movement, vibration, etc.), light, etc.) may be connected and controlled by a central control unit, such as a microprocessor controller and corresponding circuit board attached to the interface inputs 106. The inputs may be one or more of RJ-11, RJ-45, coaxial, fiber optics, etc. In this embodiment, the network element was designed to be controlled by an Ethernet cable, such as CAT-5, CAT-6, or related twisted pair cables with eight or more wires. The housing 102 is affixed to a circular frame 108 which may border the speaker grid exposed on the bottom of the device/element.

Figure 2:
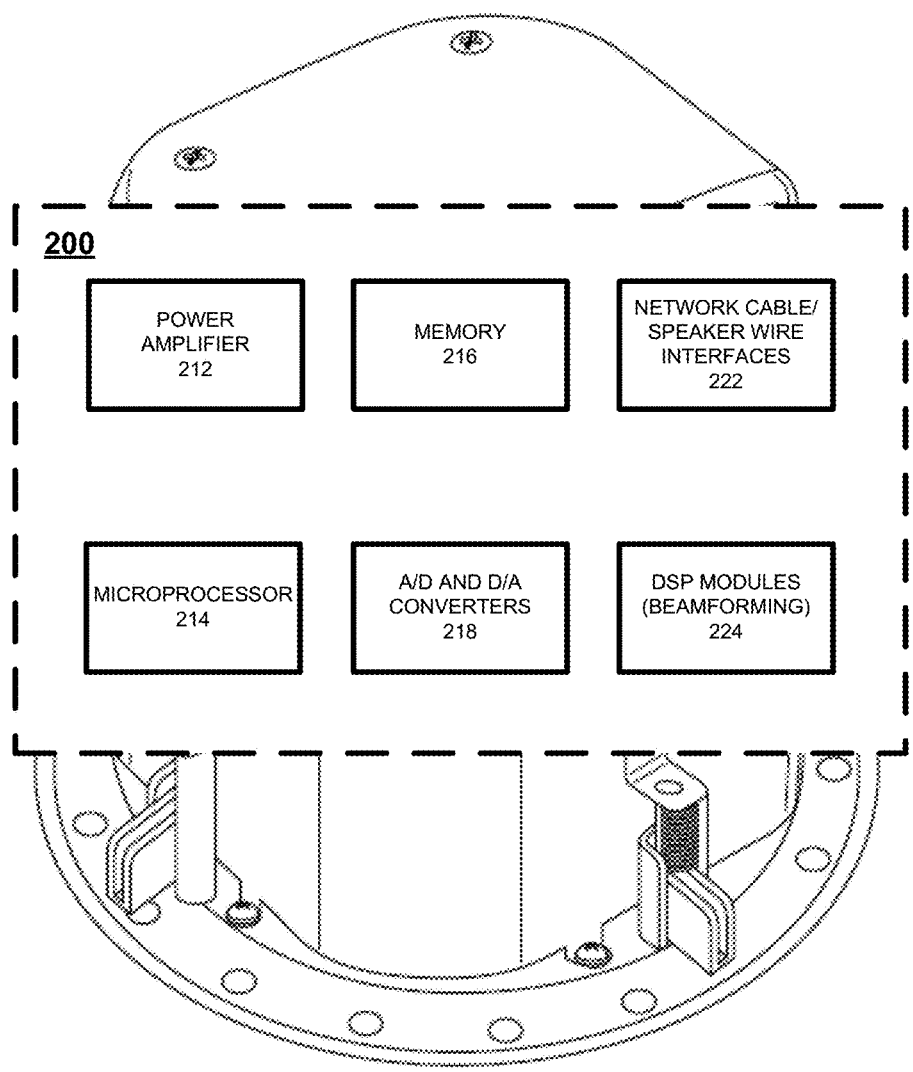
FIG. 2 illustrates a detailed summary of potential sub-systems included in the integrated media services network element according to example embodiments.

FIG. 2 illustrates a detailed summary of potential sub-systems included in the integrated media services network element according to example embodiments. Referring to FIG. 2, the example configuration provides for the internal and/or integrated elements of the device. For example, the sub-components 200 of each device may include a power amplifier 212, which may only be necessary to be installed on one of many network elements since one amplifier 212 can power a plurality of network elements, memory 216 to store operational data, a network cable interface(s) 222, a microprocessor 214, an analog-to-digital (A/D) and/or (D/A) converter 218 and a digital processor 224, which may be pre-programmed with beamforming operations to conduct certain operations, such as speaker location, modified speaker output, etc.

Figure 3:
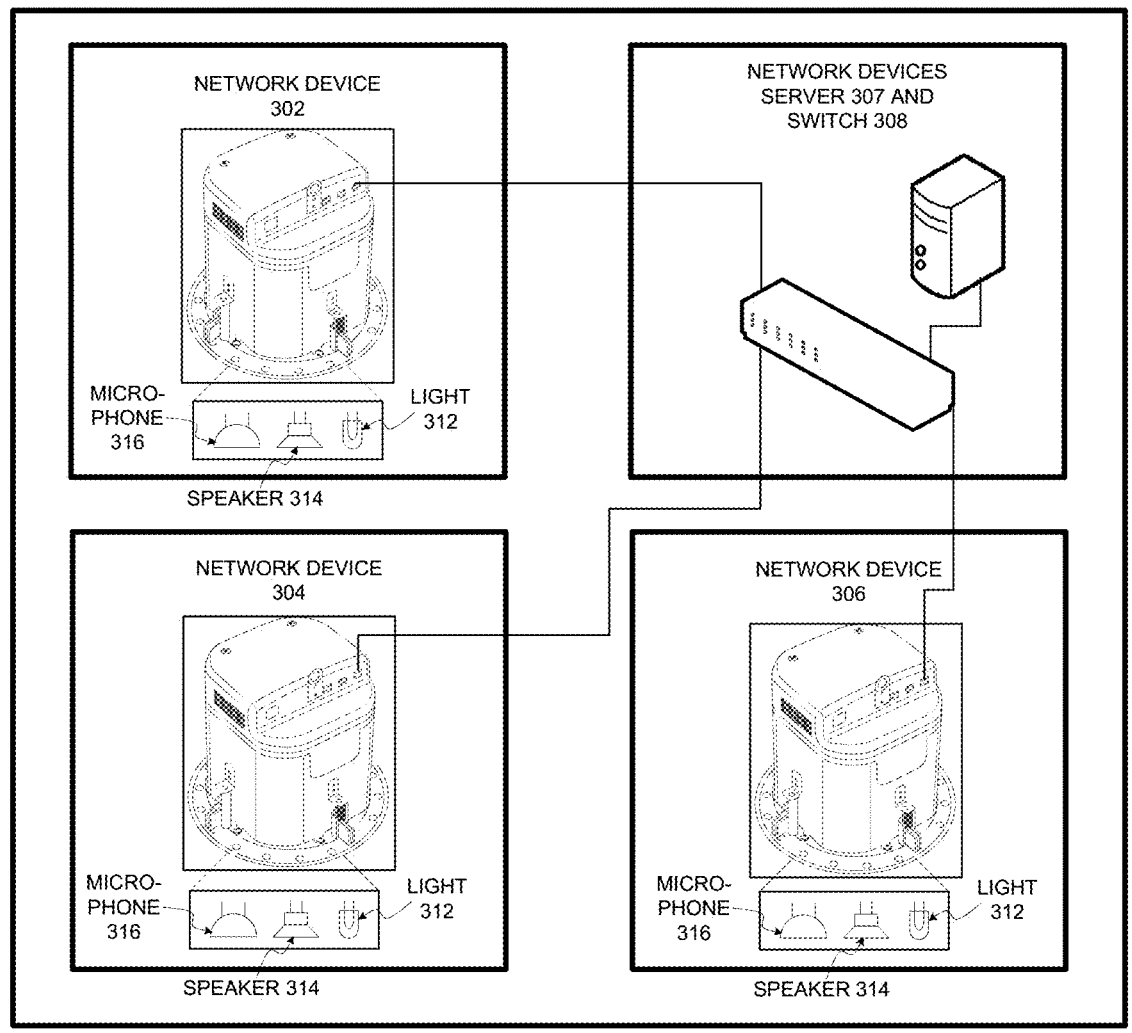
FIG. 3 illustrates a plurality of network elements communicating with centrally controlled communication service devices according to example embodiments.

FIG. 3 illustrates a plurality of network elements communicating with centrally controlled communication service devices according to example embodiments. Referring to FIG. 3, the configuration 300 includes an example where there are multiple (i.e., three) network device elements 302, 304 and 306. The devices are all connected to a wireline network cable, such as an RJ-45 (CAT-X) cable, which connects to a switch 308 which is communication with a device server 307 that processes and provides commands depending on a specific setting provided by a configuration application, which may be operated via a user interface and controlled by the server 307. Each network device 302-306 may include one or more of a microphone 316, speaker 314 and a light 312, as a few examples of configurable media. The device may also have sensors, including the microphone, which provide feedback to the server or the network device itself so certain actions can be taken, such as selective service depending on the detected sound, movement and presence of users.

In certain instances, a voice or sound detected by one microphone may be identified via a location algorithm that uses more than one microphone to identify a direction and strength of the sound. This may enable playback or audio output of the speakers to be customized according to a distance from the source of sound. The various different microphones 316 may be part of a microphone array where each microphone reports a different sound to the server 308, which can then identify which microphone is closest to the source of the sound. For example, a person speaking in one room or one part of a room may be loudest to the nearest microphone 316, however, the other microphones which are further away may provide data as to where the person is in the room and which speakers should be used to produce the sound in other parts of the area (e.g., room, conference hall, auditorium, building, etc.). In one example, the sound would not be re-produced via the speakers nearest the source since the sound would only drowned-out or cause a negative effect to those listening in that specific area. However, some sound may be produced via other speakers which are further away, and more sound may still be produced by speakers which are even further away than the other speakers so the correct amount of speaker output (dBs) is assigned to the correct speakers 314 given the location of the person speaking at that time.

Figure 4:
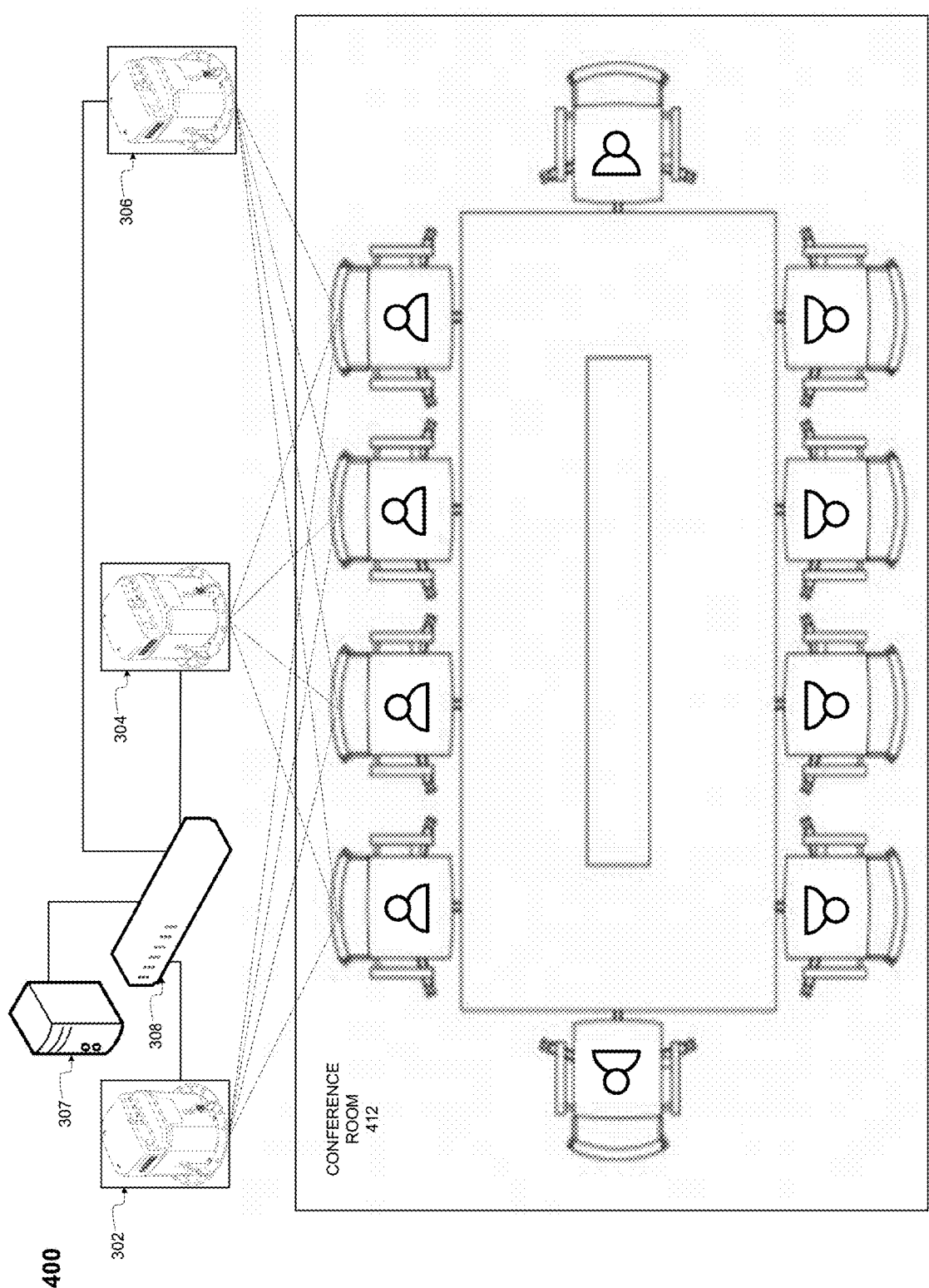
FIG. 4 illustrates a plurality of network elements operating with the control network elements in a conference room environment according to example embodiments.

FIG. 4 illustrates a plurality of network elements operating with the control network elements in a conference room environment according to example embodiments. Referring to FIG. 4, the configuration provides a set of network elements 302-306 disposed above a conference room 412 full of participants. In this example, the three network element devices 302, 304 and 306 represent units which are installed overhead in the ceiling of the room in three different places moving left (position of device 302) to right (position of device 306). The devices may be connected via a network cable to a switch 308 and server 307 which provide a central control function to control the speaker and the other features provided by the devices.

In one example of this configuration, the microphones in each of the devices may be detecting sound from one or more of the attendees to a conference meeting. In this conference room 412, one user may eventually begin talking, while the others are silent. The one user talking may be identified by each of the three microphones for each of the three different ceiling mounted devices. Each microphone may detect the sound via a different level of relative audio based on a location of the sound. For example, the first device 302 may detect the sound via a microphone of a person speaking nearest that device 302 with a louder magnitude than the other microphones. If the person speaking is directly under the microphone of device 302, then the device 304 will receive a weaker audio signal and the device 306 will detect a weaker signal as well. In this example, the speakers may be configured to produce an amplified version of the detected audio depending on the magnitude of the audio detected. For example, since the microphone in device 302 is nearest the speaking person, the audio level may be above a threshold level that identifies that the speaker of device 302 should not attempt to produce sound as the speaking person is too close to that speaker and anyone near that location will not require an amplified version of the audio. However, the device 304 may receive an audio signal that is below that maximum amplitude threshold level, but which is still a substantially strong enough signal to where the output power of the speaker of device 304 is relatively lower than other speakers. The furthest away speaker of device 306, which is furthest away from the person speaking among the other microphones, may output a louder audio signal than device 304 since the detected voice of the speaking person is quieter as detected at device 306 than the magnitude of device 304. Therefore, each speaker of each device is outputting a different level of audio, one is providing little or no output, one is providing a small amount of audio output but more than the former speaker, and the last is providing a louder amount of audio to reproduce the voice of the person speaking at that time so all participants can hear depending on their location in a particular venue. This dynamic approach to customizing output audio levels may be helpful in larger rooms with large distances between different walls and corners of the room. In summary, one speaker may be outputting at a first level of audio magnitude A1 and that speaker may be nearest the source of sound, and a second speaker may be outputting at a second level of audio magnitude A2, whish is A1 (1.5) or some other multiplier to increase the audio magnitude by a value greater than one, and that speaker may be further away from the source of sound. The third speaker may output a signal at a value A1 (2.0) or some value that is at least twice the original magnitude of A1, and that speaker is even further away from the first source of sound than the first two speakers.

Figure 5:
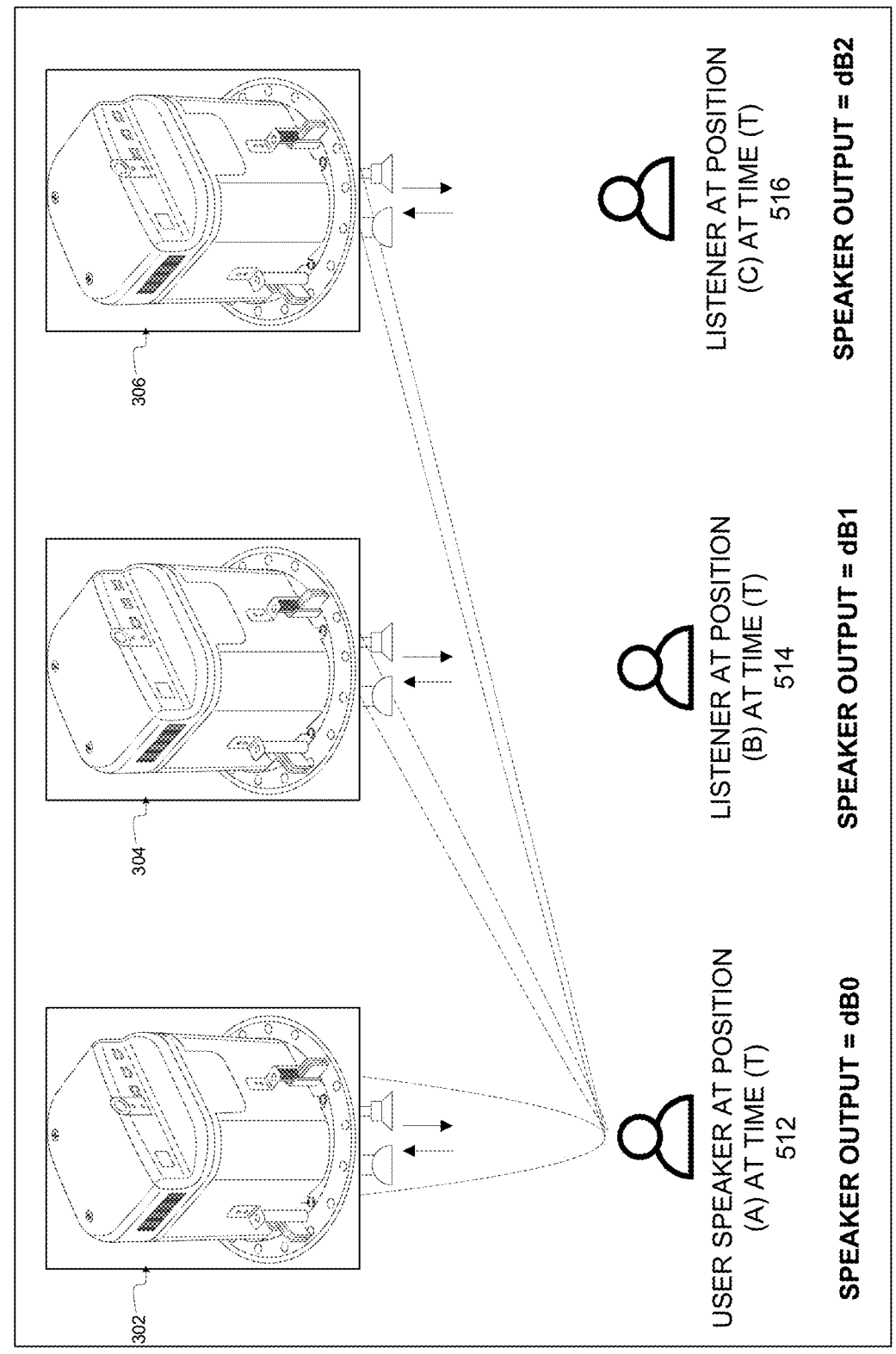
FIG. 5 illustrates a plurality of network elements operating with the control network elements in a conference room to provide varying levels of speaker output based on microphone input and beamforming operations, according to example embodiments.

FIG. 5 illustrates a plurality of network elements operating with the control network elements in a conference room to provide varying levels of speaker output based on microphone input and beamforming operations, according to example embodiments. Referring to FIG. 5, the example configuration 500 includes detecting a user speaker 512 at a time (T) via a microphone of a first device 302. The user speaker 512 is closest to the device 302 and thus the level of audio detected via the microphone of device 302 may be above an audio threshold level where no output audio is required by that device 302. Audio may only be generated by a speaker with a microphone location where audio is below that audio threshold level. The listeners 514 and 516 may be located at positions B and C which are respectively closest to devices 304 and 306. Device 304 may output via a loudspeaker, an amplified rendition of the user speaker's voice (512) at a first level (dB1) measured in dBs. The distance between device 302 and 304 is less than the distance between devices 302 and 306. In this case, the output audio of user A's voice from the device 306 loudspeaker is louder than the output of the loudspeaker from device 304, and the output of the loudspeaker from device 302 is less than both the output of the loudspeakers associated with device 304 and 306. When a microphone of device 304 detects an audio signal then the output audio signal of the speaker of device 304 may be inversely proportional to the audio signal level detected by the microphone of that same device. If an audio signal has a small value as detected by a microphone of particular device, then the audio output magnitude from the speaker of the same device will be larger in magnitude to compensate for the position of the device in a particular venue.

The speaker portion of the network device elements may also be referred to as a 'loudspeaker'. The loudspeaker may produce sound, based on received sound from one or more of an array of microphones. Each network device element may have its own microphone array and/or the entire set of microphones among each of the network elements may be the basis for the microphone array. The microphone array may assist with beamforming computations, based on more than one microphone, to identify locations of users that are speaking. Beamforming permits the signal to be focused and manipulated for digital filtering, modifying and improving of the identified sound for optimal user experiences and/or from recording purposes. Geolocating the sound source inside a room may have various purposes. Such data could provide camera pointing of a camera, or electronic pan tilt zoom, so the desired data can be extracted by more than one camera or from a particular large angle camera depending on where the sound is originating.

Figure 6A:
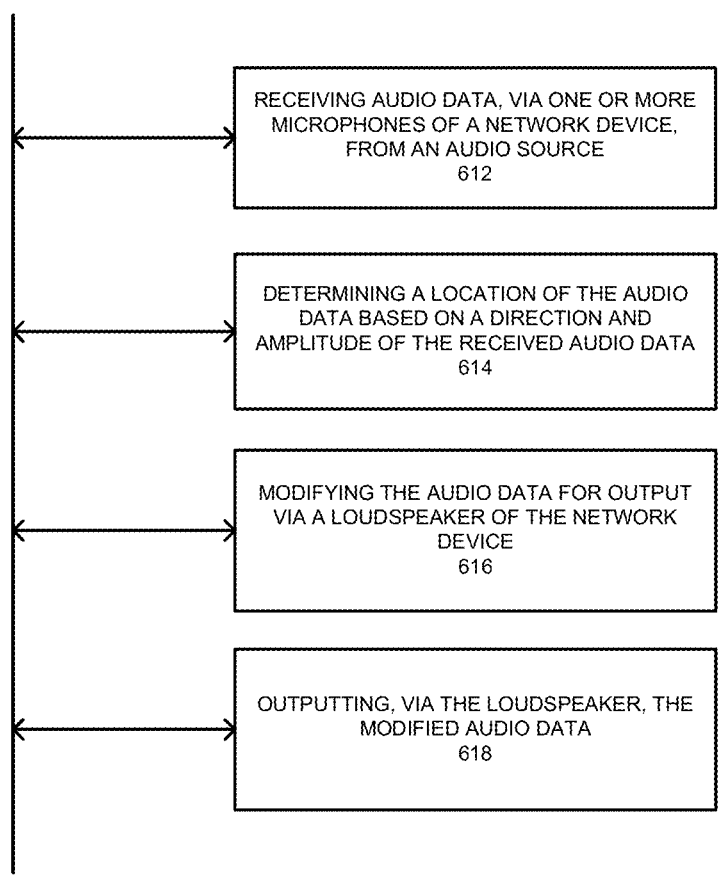
FIG. 6A illustrates a flow diagram of an example process of managing a network device to provide modified audio output, according to example embodiments.

FIG. 6A illustrates a flow diagram of an example process of managing a network device to provide modified audio output, according to example embodiments. Referring to FIG. 6A, the process 600 may include receiving audio data, via one or more microphones of a network device, from an audio source 612, such as a person speaking, determining a location of the audio data based on a direction and amplitude of the received audio data 614, modifying the audio data for output via a loudspeaker of the network device 616, and outputting, via the loudspeaker, the modified audio data 618.

The method may also include determining an audio amplitude to apply to the audio data, based on the location and the direction, when outputting the modified audio data, forwarding the received audio data to a server, and receiving the modified audio data from the server. The method may also include filtering the received audio data to create the modified audio data, receiving the audio data at a plurality of microphones in the network device, and creating a beamform of the audio data based on the received audio data at the plurality of microphones. The method may also include determining the direction of the audio data based on the beamformed audio data, determining an amplitude of the audio data is above a threshold audio data level, and responsive to determining the audio data is above the threshold audio data level, outputting the modified audio data at a zero amplitude.

Figure 6B:
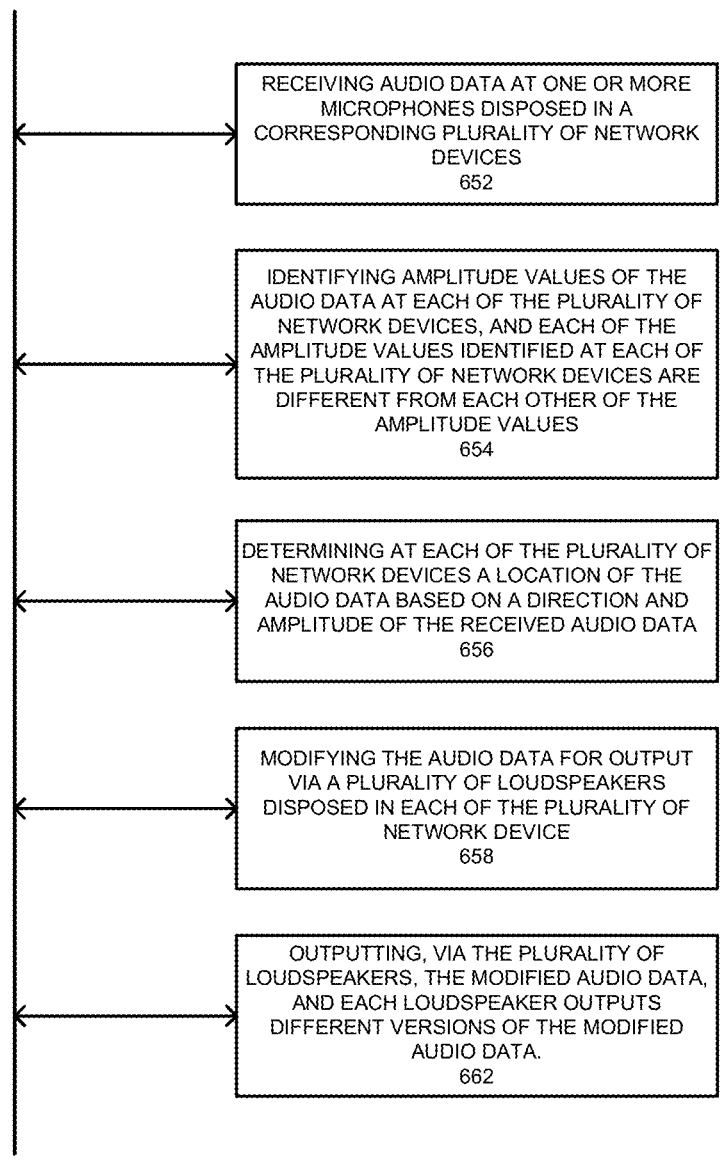
FIG. 6B illustrates a flow diagram of an example process of managing various network devices to provide modified audio output, according to example embodiments.

FIG. 6B illustrates a flow diagram of an example process of managing various network devices to provide modified audio output, according to example embodiments. The process 650 may include receiving audio data at one or more microphones disposed in a corresponding plurality of network devices 652, identifying amplitude values of the audio data at each of the plurality of network devices, and each of the amplitude values identified at each of the plurality of network devices are different from each other of the amplitude values 654, determining at each of the plurality of network devices a location of the audio data based on a direction and amplitude of the received audio data 656, modifying the audio data for output via a plurality of loudspeakers disposed in each of the plurality of network device 658, and outputting, via the plurality of loudspeakers, the modified audio data, and each loudspeaker outputs different versions of the modified audio data 662.

The different versions of the modified audio data include different amplitudes of the modified audio data. The plurality of loudspeakers include three or more loudspeakers and the loudspeaker that is located nearest to the audio data location outputs a smaller amplitude of the modified audio data than a next nearest loudspeaker to the audio data location, and the loudspeaker that is located a furthest distance from the audio data location outputs a larger amplitude of the modified audio data than the other loudspeakers. The loudspeaker that is located the nearest to the audio data location outputs no audio signal. The process may also include determining the different amplitudes of the modified audio data based on the location and the direction of the received audio data, receiving the audio data at a plurality of microphones in the plurality of network devices, and creating a beamform of the audio data based on the received audio data at the plurality of microphones. Also, the process may also provide determining the direction of the audio data based on the beamformed audio data.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
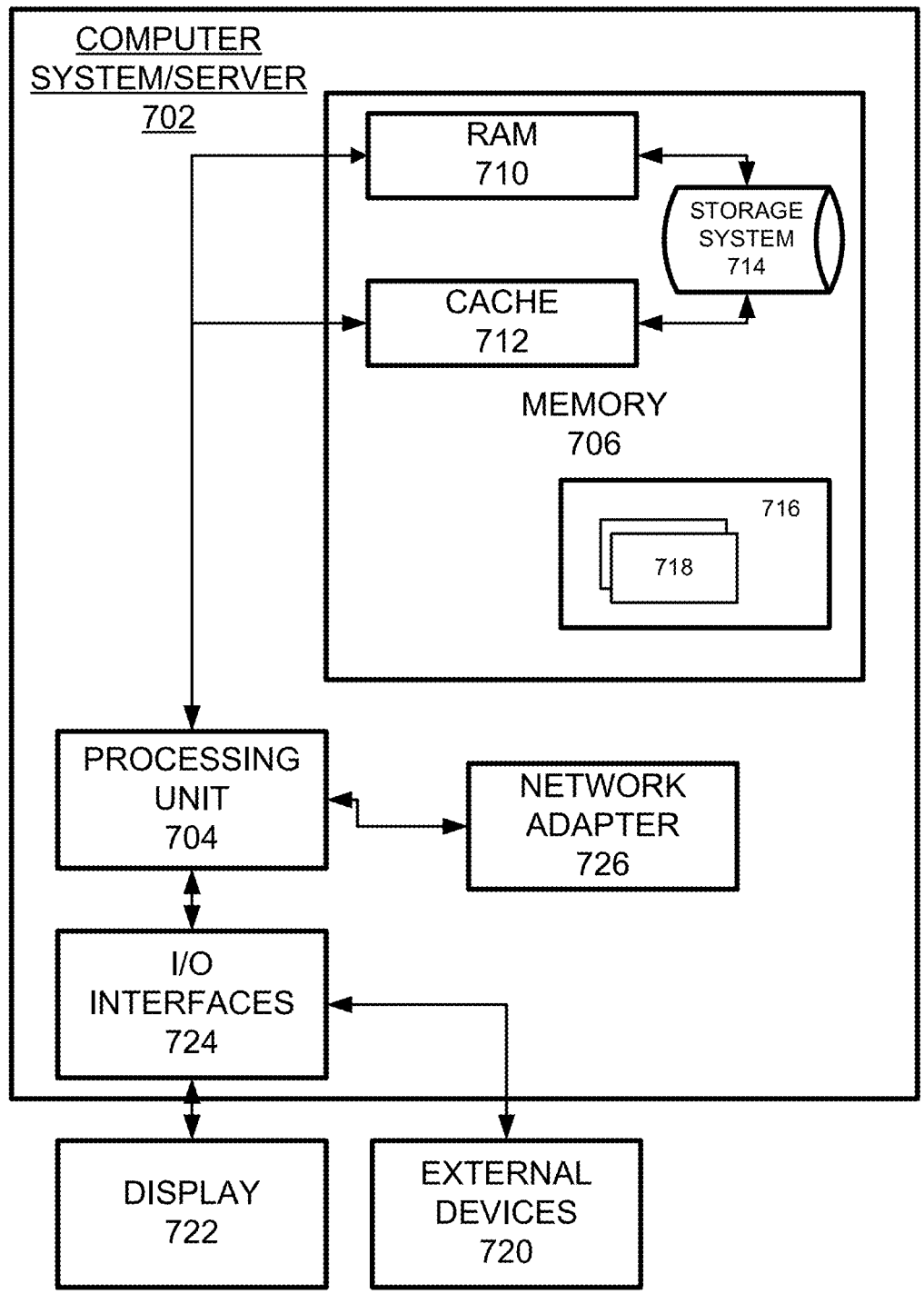
FIG. 7 illustrates an example system entity configured to perform one or more operations corresponding to the example embodiments.

FIG. 7 is not intended to suggest any limitation as to the scope of use or functionality of embodiments of the application described herein. Regardless, the computing node 800 is capable of being implemented and/or performing any of the functionality set forth herein.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via a network adapter. The network adapter communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
 receiving audio data, via one or more microphones of two or more network devices, from an audio source;
 determining a location of the audio data based on a direction and amplitude of the received audio data;
 modifying the audio data for output via two or more loudspeakers of the two or more network devices; and
 outputting, via the two or more loudspeakers, the modified audio data as two or more different audio streams, wherein an audio amplitude is determined to apply to the audio data, based on the location and the direction, when outputting the modified audio data.

2. The method of claim 1, comprising
 forwarding the received audio data to a server; and
 receiving the modified audio data from the server.

3. The method of claim 1, comprising
filtering the received audio data to create the modified audio data.

4. The method of claim 1, comprising
receiving the audio data at a plurality of microphones; and
creating a beamform of the audio data based on the received audio data at the plurality of microphones.

5. The method of claim 4, comprising
determining the direction of the audio data based on the beamformed audio data.

6. The method of claim of claim 1, comprising
determining an amplitude of the audio data is above a threshold audio data level; and
responsive to determining the audio data is above the threshold audio data level, outputting the modified audio data at a zero amplitude.

7. An apparatus comprising:
a receiver configured to receive audio data, via one or more microphones of two or more network devices, from an audio source;
a processor configured to
determine a location of the audio data based on a direction and amplitude of the received audio data;
modify the audio data for output via two or more loudspeakers of the two or more network devices; and
output, via the two or more loudspeakers, the modified audio data as two or more different audio streams, wherein an audio amplitude is determined to apply to the audio data, based on the location and the direction, when the modified audio data is outputted.

8. The apparatus of claim 7, wherein the processor is further configured to forward the received audio data to a server; and
receive the modified audio data from the server.

9. The apparatus of claim 7, wherein the processor is further configured to filter the received audio data to create the modified audio data.

10. The apparatus of claim 7, wherein the receiver is further configured to receive the audio data at a plurality of microphones, and wherein the processor is further configured to create a beamform of the audio data based on the received audio data at the plurality of microphones.

11. The apparatus of claim 10, wherein the processor is further configured to determine the direction of the audio data based on the beamformed audio data.

12. The apparatus of claim 7, wherein the processor is further configured to determine an amplitude of the audio data is above a threshold audio data level, and responsive to the audio data being determined as above the threshold audio data level, output the modified audio data at a zero amplitude.

13. A non-transitory computer readable storage medium configured to store instructions that when executed cause a processor to perform:
receiving audio data, via one or more microphones of two or more network devices, from an audio source;
determining a location of the audio data based on a direction and amplitude of the received audio data;
modifying the audio data for output via two or more loudspeakers of the two or more network devices; and
outputting, via the two or more loudspeakers, the modified audio data as two or more different audio streams, wherein an audio amplitude is determined to apply to the audio data, based on the location and the direction, when outputting the modified audio data.

14. The non-transitory computer readable storage medium of claim 13, wherein the processor is further configured to perform:
forwarding the received audio data to a server; and
receiving the modified audio data from the server.

15. The non-transitory computer readable storage medium of claim 13, wherein the processor is further configured to perform
filtering the received audio data to create the modified audio data.

16. The non-transitory computer readable storage medium of claim 13, wherein the processor is further configured to perform:
receiving the audio data at a plurality of microphones; and
creating a beamform of the audio data based on the received audio data at the plurality of microphones.

17. The non-transitory computer readable storage medium of claim 13, wherein the processor is further configured to perform:
determining the direction of the audio data based on the beamformed audio data.

* * * * *